United States Patent [19]
Olsen et al.

[11] 3,732,753
[45] May 15, 1973

[54] ELECTROHYDRAULIC TRANSMISSION CONTROL

[75] Inventors: Howard E. Olsen, Iron Mountain; Robert J. Petry, Berkley, both of Mich.

[73] Assignee: General Motors Corporation, Detroit, Mich.

[22] Filed: Jan. 7, 1972

[21] Appl. No.: 216,110

[52] U.S. Cl.................................74/866, 74/752 A
[51] Int. Cl..........................B60k 21/00, F16h 3/74
[58] Field of Search.......................................74/866

[56] References Cited

UNITED STATES PATENTS

| | | | |
|---|---|---|---|
| 2,855,794 | 10/1958 | Faisander | 74/866 |
| 3,604,288 | 9/1971 | Mori | 74/866 X |
| 3,670,598 | 6/1972 | Mori | 74/866 |

*Primary Examiner*—Arthur P. McKeon
*Attorney*—Jean L. Carpenter et al.

[57] ABSTRACT

A closed loop control for an automotive vehicle transmission includes a hydraulically driven rotary valve for selectively connecting feed and exhaust hydraulic lines to the transmission brakes and clutches thereby selecting an operational mode of the transmission according to the rotational position of the valve. An electrical transducer produces a signal corresponding to the valve position. A control circuit responsive to the position of a manually controlled range selector, a transmission output speed signal and an input torque signal generates a voltage according to the desired operational mode and compares this voltage to that from the rotary valve position sensor. A control signal is generated according to the difference in these voltages which control signal actuates a proportional solenoid valve which in turn controls the position of a spool valve. The spool valve then hydraulically operates the rotary valve to move it to a position determined by the control signal so that the new position will be consistent with the operating mode selected by the control circuit.

3 Claims, 5 Drawing Figures

ELECTROHYDRAULIC TRANSMISSION CONTROL

This invention relates to an electrohydraulic transmission control and particularly to such a control for an automatic vehicle transmission.

Conventionally, automatic transmission for automotive vehicles are controlled by a very elaborate array of shift valves and a complex hydraulic circuit. Electrical transmission controls have been proposed but it has been found that when put into practical application, these controls too become very complex.

It is therefore an object of this invention to provide an electrohydraulic automatic transmission control which is relatively simple and eliminates much of the complex mechanism required in previous controls.

More particularly, it is an object of this invention to provide an electrohydraulic transmission control having a rotary valve for selecting transmission modes of operation and a closed loop servo system for controlling the rotary valve to the appropriate position.

The invention is carried out by providing a hydraulically driven rotary valve for transmission mode selection, an electrical valve position sensor and a control circuit for selecting the desired mode of transmission operation and for producing a control signal according to any difference between the desired mode and the actual mode as sensed by the valve position sensor. The control signal operates a proportional solenoid valve which generates a pressure to actuate a spool valve which in turn is connected to drive the rotary valve to a position consistent with that requested by the control circuit. The invention particularly contemplates that the control circuit be sensitive to the position of a manually controlled range selector, the speed of the transmission output, and the transmission input torque.

The above and other advantages will be made more apparent from the following specification taken in conjunction with the accompanying drawings wherein like reference numerals refer to like parts and wherein.

THE SYSTEM

Figure 1:
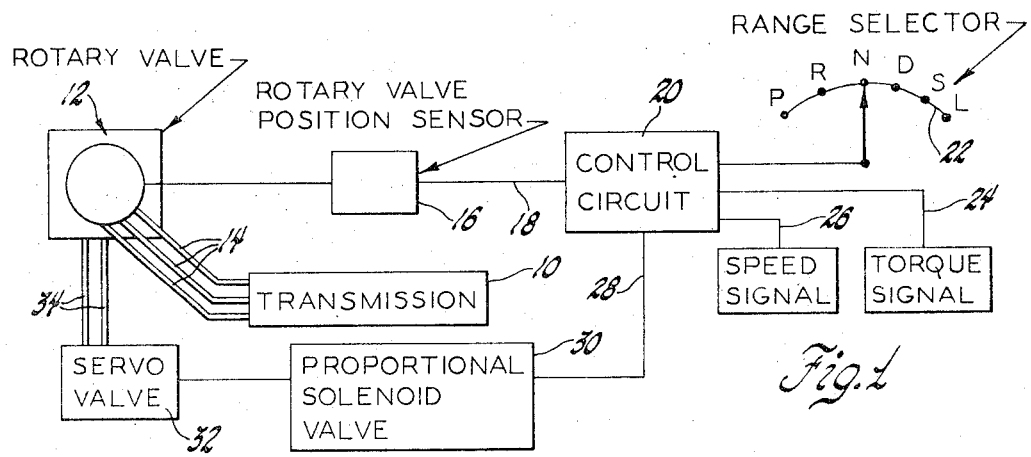
FIG. 1 is a block diagram of an electrohydraulic transmission control system according to the invention.

Referring to FIG. 1, the transmission 10, which is acted upon by the subject control, is of the type which is placed in any of several operating modes by the selective actuation of several brakes and clutches and which contains a source of regulated hydraulic pressure useful for operating the hydraulic portion of the subject control. An example of a transmission which is particularly suited for control according to the subject invention is that disclosed in the U.S. Pat. to Van Lent et al. No. 3,541,887. A rotary valve 12 is connected to the transmission 10 by hydraulic conduits 14. The valve 12 is arranged to be hydraulically rotated to any one of several positions, each of which represents a mode of operation of the transmission. For each valve position certain of the conduits 14 are connected to line pressure and others are connected to exhaust to effect the appropriate selective operation of the transmission clutches and brakes. An electrical valve position sensor 16 is mechanically connected to the valve 12 for rotation therewith and may comprise a potentiometer for producing an output voltage on line 18 which voltage has a distinct value corresponding to each mode position of the valve 12.

The line 18 is connected to a control circuit 20 to provide an input thereto. Other inputs are a manually operated range selector switch 22, a torque signal on line 24 which represents an engine operating parameter and preferably is derived from the position of the engine throttle as through an electrical potentiometer and a speed signal on line 26 which is generated by a transducer responsive to the speed of the transmission output shaft. Both the speed signal and the torque signal are positive DC voltages proportional to their respective parameters. The control circuit 20 selects a desired transmission operating mode as a function of the inputs 22, 24 and 26. A voltage is produced which has a magnitude representing the desired transmission operating mode and that voltage is compared with the one on line 18 to determine the error between actual and desired modes, if any, and the control signal on line 28 is produced according to the relative values of those voltages.

The line 28 is connected to a proportional solenoid valve 30 which produces hydraulic control pressure as a direct function of the control signal. A servo valve 32 responsive to the proportional pressure from solenoid valve 30 comprises a spool valve shiftable in opposite directions according to the value of the control pressure to effect selective rotation of the rotary valve 12 according to the direction of shift of the spool valve. Conduits 34 hydraulically connect the valve 32 with the rotary valve 12, the latter containing a fluid motor responsive to the pressures in the conduits 34. Whenever the actual transmission mode is the same as the desired mode, the control signal on line 28 is such that the servo valve 32 assumes a neutral position permitting no fluid flow in the conduits 34 to thereby lock the rotary valve into position.

THE ROTARY VALVE

Figure 2:
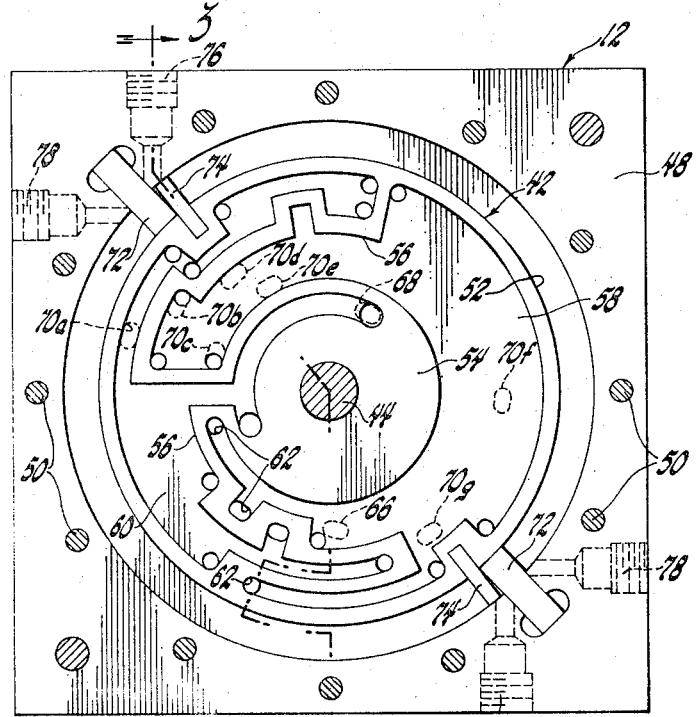
FIG. 2 is a cross-sectional view of the rotary valve of FIG. 1 taken along line 2—2 of FIg. 3.
Figure 3:
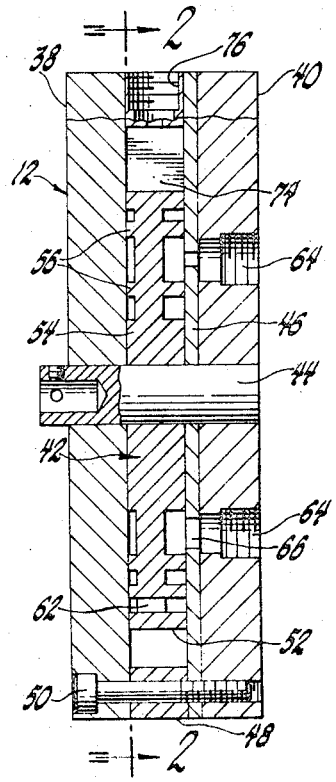
FIG. 3 is a cross-sectional view of the rotary valve taken along line 3—3 of FIG. 2.

Referring to FIGS. 2 and 3, the rotary valve comprises two flat plates 38 and 40 having sandwiched therebetween a rotary valve plate 42 rotatably mounted on a spindle 44 and an orifice plate 46 adjacent the outer plate 40. A spacer 48 surrounds the valve plate 42 and performs the dual functions of spacing the plates 38 and 46 and acting as a portion of the valve drive motor to be described below. The entire valve assembly is secured by a series of bolts 50.

The valve plate 42 is an integral structure including an outer rim 52, an inner hub 54 and a convoluted land portion 56 connecting the rim and the hub all of which are in sliding sealing engagement with the plates 38 and 46. The remainder of the valve plate is of reduced section and is divided into two chambers, 58 and 60, by the land 56, The opposite side of the valve plate is formed in the same configuration and the two sides of the plate are interconnected by apertures 62 so that the fluid pressure across the plate will be equalized. The plate 40 has provision for several hydraulic fittings 64 which communicate with the chambers 58 and 60 through appropriate ports in the orifice plate 46. A port 66 is connected to exhaust so that the chamber 58 is an exhaust chamber while a port 68 is connected to hydraulic line pressure so that the chamber 60 is always at line pressure. The other ports 70a through 70g are connected to the lines 14 extending to the transmission 10 for operation of the several brakes and clutches. Port 70a is connected to the reverse neutral drive line, port 70b is connected to a forward clutch, ports 70c and 70e are connected to the third clutch through a conventional shuttle valve, port 70d is connected to the second brake, port 70f is connected to the intermediate boost line and the port 70g is connected to the low reverse brake. These ports are selectively connected to line pressure or exhaust according to the rotary position of the valve plate 42.

The rotation of the valve plate is accomplished by a hydraulic vane motor which comprises two chambers defined by the spacer 48 and the outer rim 52 of the valve plate and divided by a pair of seals 72. A pair of vanes 74 in the motor chamber are secured to the valve plate for effecting rotation of the valve plate when the motor chambers are suitably pressurized. To this end, two pairs of ports 76 and 78 are connected to the servo valve 32 via the conduits 34 so that the ports will be connected to line pressure or exhaust as dictated by the position of the servo valve 32. In the position shown in FIG. 2, the transmission is in neutral mode. As the valve plate is rotated clockwise through successive increments of approximately 18°, the mode will shift sequentially to reverse, drive first, drive second, and the other required modes.

THE SOLENOID VALVE AND SERVO VALVE

Figure 4:
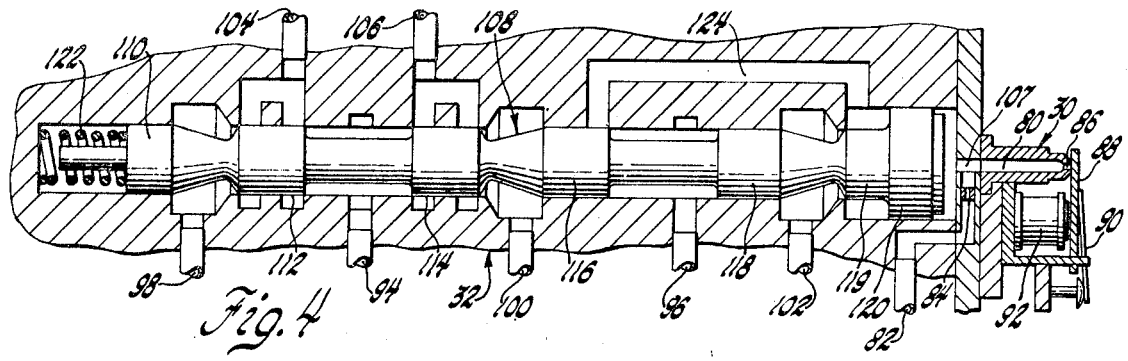
FIG. 4 is a schematic view of the spool valve and the proportional solenoid valve of FIG. 1.

FIG. 4 shows the proportional solenoid valve 30 and the servo valve 32. The solenoid valve comprises a control chamber 80 connected to a line pressure passage 82 through an orifice 84. An exhaust orifice 86 is closed by a flapper valve 88 so that the fluid pressure in the control chamber 80 depends upon the force exerted by the flapper valve 88 against the orifice 86. To that end, a leaf spring 90 urges the flapper valve 88 against the orifice 86 with sufficient force to maintain the control pressure at some minimum value. A solenoid 92 connected to the line 28 carrying the electrical control signal further urges the flapper valve 88 against the orifice with a force which depends upon the magnitude of the control signal. Thus the pressure in the control chamber 80 increases as the control signal on line 28 increases and may reach a maximum of say 110 psi.

The servo valve 32 comprises a valve body having ports 94 and 96 connected to line pressure, and exhaust ports 98, 100 and 102. Control ports 104 and 106 are connected to the lines 34 which extend to the motor of the rotary valve 12 and a port 107 is connected to and forms a part of the control chamber 80 of the proportional solenoid valve 30. A spool valve 108 within the valve body comprises spaced lands 110, 112, 114, 116, 118 and 119 all of equal size and a land 120 of larger diameter. The valve is biased to the right as shown in the drawing by a spring 122. A passage 124 in the valve body is connected between the area of the lands 116 and 119 and is so formed that the edge of the passage at either end makes a line to line fit with the edge of the lands when the valve is in a neutral position as shown. The servo valve has two portions, a control portion and a regulator portion. The control portion includes lands 110, 112 and 114 and is effective to connect line pressure or exhaust to either of the ports 104 and 106 to drive the rotary valve in either direction. When the spool is in the neutral position as shown in the drawing, no fluid flow is permitted through the control portion and the rotary valve is locked in position. The regulator portion of the valve determines the valve position as a function of the pressure in the control chamber 80. When that pressure becomes sufficient to override the spring bias on the spool valve, the valve is shifted to the left allowing fluid to flow through the passage 124 to act on the left side of the land 120, thereby tending to counterbalance the pressure on the right side of that land. In the event the pressure in the passage 124 becomes too great, the valve shifts to the right to connect the passage 124 to the exhaust port 102 to decrease the pressure on the left of the land 120 allowing the spool to return again toward the left. Thus, the valve regulates about the neutral position when the pressure in the control chamber 80 is stable. When, however, the control pressure changes, the valve will shift in one direction or the other until the control pressure again stabilizes. The net effect then of the proportional solenoid 30 and the servo valve 32 is that when the control signal on line 28 is in a nominally steady state condition, the spool valve will be in neutral position, thereby locking the position of the rotary valve 12. When, however, the control signal increases above its normal magnitude, the pressure in the control chamber 80 will increase to shift the valve to the left thereby connecting the port 104 to line pressure and exhausting the port 106. When, however, the control signal drops below its nominal steady state magnitude, the opposite will occur. The control section of the valve is "steady state" and "transient" flow compensated for minimum axial forces on the valve. The regulating section is flow compensated for negative force to prevent over-shoot.

THE CONTROL CIRCUIT

Figure 5:
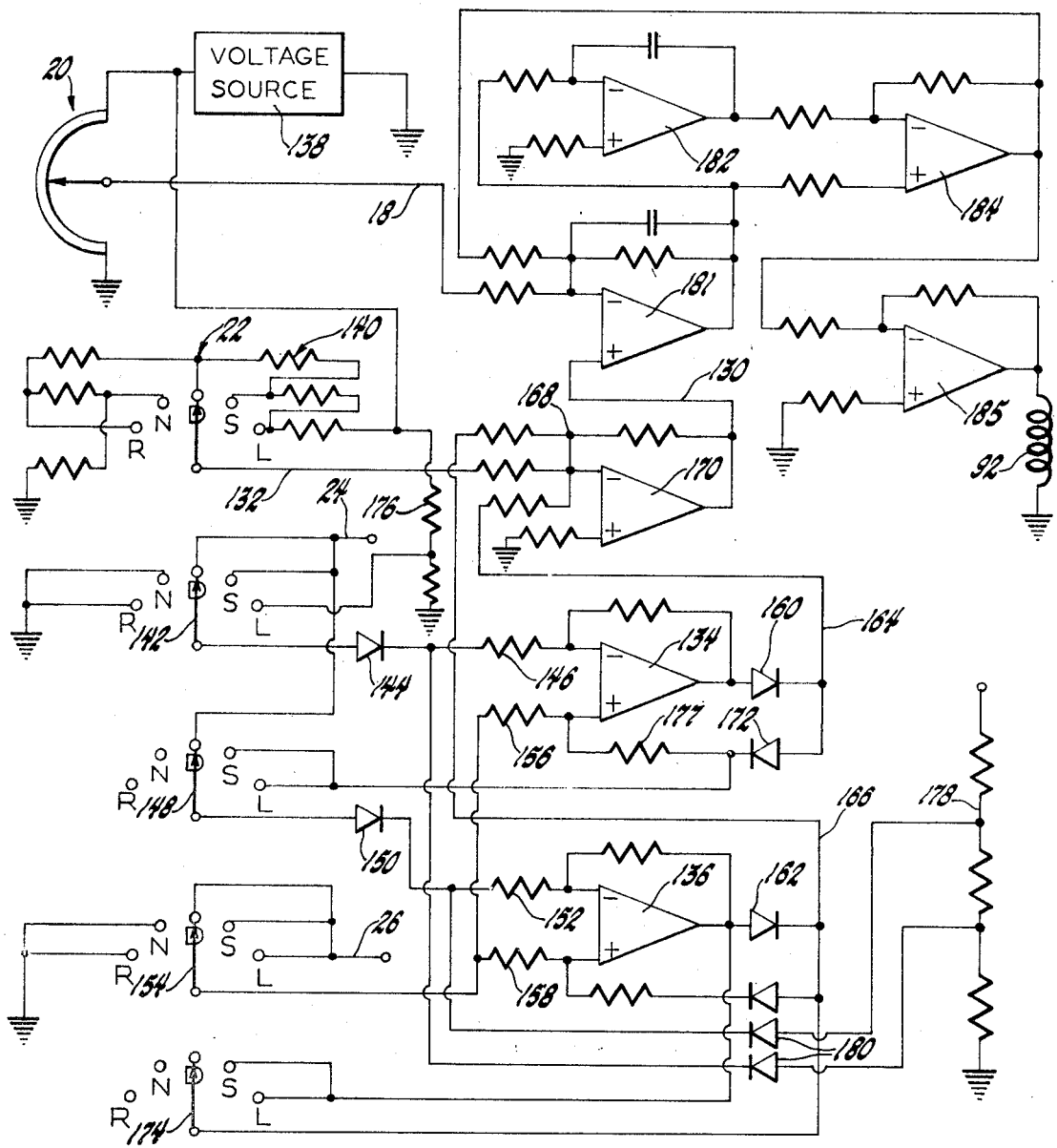
FIG. 5 is a schematic electrical diagram of the control circuit of FIG. 1.

The control circuit 20 as shown in FIG. 5 in conjunction with the range selector 22 produces on line 130 a signal of 1 to 9 volts wherein each integral voltage corresponds to a transmission mode and corresponds to the similar voltage on line 18 from the rotary valve position sensor 16. The signal on line 130 is achieved by summing the voltage from a selector position switch 22 and carried by line 132 and the voltage from a shift logic circuit which includes operational amplifiers 134 and 136 operating in conjunction with portions of the range selector switch 22 and responsive to the torque and speed signals on lines 24 and 26. The circuit is designed to operate according to the following truth table which shows for each mode of operation the voltage produced by the selector switch, by each amplifier 134 and 136, and the sum thereof.

| Mode | Selector Switch | Amplifier 134 | Amplifier 136 | Sum (line 130) | Rotor Valve Position |
|---|---|---|---|---|---|
| N | 1 | 0 | 0 | 1 | 1 |
| R | 2 | 0 | 0 | 2 | 2 |
| Dr 1st | 3 | 0 | 0 | 3 | 3 |
| Dr 2nd | 3 | 1 | 0 | 4 | 4 |
| Dr 3rd | 3 | 1 | 1 | 5 | 5 |
| S 2nd | 6 | 1 | −1 | 6 | 6 |
| S 1st | 6 | 0 | 1 | 7 | 7 |
| Lo 2nd | 8 | 1 | −1 | 8 | 8 |
| Lo 1st | 8 | 0 | 1 | 9 | 9 |

The system logic requires that the sum of the selector and logic circuit voltages (on line 130) are equal to the voltage on line 18 (rotor valve position) and the logic circuit outputs may be +1, −1 or zero.

A voltage source 138 regulated to 10 volts is connected to a voltage divider 140 having several taps each connected to one of the contacts corresponding to the reverse, neutral, drive, super and low switch positions. As seen in the table, the voltages 1, 2, 3, 6 and 8 are assigned to neutral, reverse, drive, super and low ranges respectively. The remaining possible voltages 4, 5, 7 and 9 are produced by the shift logic circuit in conjunction with the selector position voltage. When the selector switch is in reverse or neutral position, there are no torque or speed signals fed to the shift logic circuit so that the output of that circuit is zero as shown in the table. When the selector switch is in the drive position as shown in FIG. 5, the torque signal on line 24 is connected through a selector switch segment 142 through a diode 144 and through an input resistor 146 to the negative input terminal of the operational amplifier 134. The same torque signal is fed through a switch segment 148 and to a diode 150 and an input resistor 152 to the negative terminal of the operational amplifier 136. The speed signal on line 26 is fed through another switch segment 154 and through input resistors 156 and 158 to the positive terminals of the amplifiers 134 and 136 respectively. The outputs of the amplifiers 134 and 136 are fed through the diodes 160 and 162 and lines 164 and 166 respectively, to a junction point 168 which is connected to the negative input of a summing amplifier 170 that produces the output on line 130 representing the combined voltages of the amplifiers 134 and 136 and the voltage on line 132. When the torque signal exceeds the speed signal at both the amplifiers 134 and 136, the amplifier outputs will be negative thereby reverse biasing the diodes 160 and 162 to present no net output to the summing junction 168. Thus the net output of the shift logic circuit is zero and the output on line 130 will equal the voltage on line 132 or 3 volts, to satisfy the condition for the drive first mode. When the speed signal becomes greater than the torque signal at the amplifier 134, the amplifier will switch to a positive output thereby presenting a 1 volt signal on line 164 to raise the voltage on line 130 to 4 volts to satisfy the condition for drive second mode. The amplifier 136 does not switch at this time since the values of the input resistors 152 and 158 are judiciously selected to provide a switch point different from that of the amplifier 134. When, however, the speed and torque signals become such that the amplifier 136 does switch to a positive output, then the line 130 will have its voltage increased to 5 volts corresponding to the drive third mode.

When the selector switch is moved to super position, the circuit operation is similar except that the torque signal to the amplifier 136 is eliminated and in place thereof the signal on line 164 is fed thereto through a diode 172, the switch segment 148 and the diode 150. Thus, when the amplifier 134 produces a positive output, the amplifier 136 is biased to have a negative output. The negative output is connected to the conductor 166 through the switch segment 174 which bypasses the diode 162 when the selector is in the super or low position. Then the positive and negative outputs of the amplifiers 134 and 136 cancel each other so that the output of the summing amplifier 170 on line 130 is 6 volts corresponding to the voltage on line 132, thereby satisfying the condition for the super second mode. When the relative torque and speed signals are such that the amplifier 134 switches to a negative output, the amplifier 136 will switch to a positive output thereby having the net effect of increasing the voltage on line 132 to 7 volts corresponding to the super first position.

When the range selector is in low position, the negative input of the amplifier 134 is connected to a lockout voltage derived from a potentiometer 176 connected to the voltage source 138. The lockout signal is normally adequate to bias the output of the amplifier 134 negatively and the amplifier 136 will have a positive output since there is no torque signal to its negative input. Accordingly, the 1 volt on line 166 added to the 8 volts on line 132 will provide a 9 volt value at line 130 corresponding to the low first mode. In the event, however, that very high speeds occur in this mode, say 40 mph, the speed signal at the positive input of the amplifier 134 will become sufficient to overcome the lockout signal to switch the amplifier 134 to a positive output which as before produces a negative output at the amplifier 136 so that the resulting voltage on line 130 will be 8 volts corresponding to the low second range.

Additional logic circuit features include a feedback resistor 177 between the diode 172 and the positive input of the amplifier 134 to provide a hysteresis action upon amplifier switching. A similar circuit is associated with the amplifier 136. A through detent circuit which is energized by means not shown when the accelerator linkage is moved beyond its full throttle open position comprises a potentiometer 178 connected through diodes 180 to the negative inputs of the amplifiers 134 and 136. The energization of those terminals simulates a high torque signal which effects the downshift of the transmission to a lower mode in the selected range assuming that the transmission is not already in the lowest mode.

The signal carried by the line 130 as stated above represents the desired mode of transmission operation. This is compared to the actual mode as signified by the voltage on line 18 by a differential amplifier 181 which has those two signals as its inputs. The output of the differential amplifier then will represent the difference of the desired and the actual mode. An augmenting integrator circuit comprises an integrator 182 connected to the output of the differential amplifier 181 and an inverting operational amplifier 184 having one input connected to the integrator output and the other input connected to the differential amplifier output. The output of the inverter 184 is fed back to the differential amplifier input. The augmenting integrator has the function of producing a large output corresponding to a small change in its input. The output of the augmenting integrator is connected to a power amplifier 185 which in turn produces a current in the solenoid 92 of the proportional solenoid valve 30.

The system is so arranged that when the voltages on lines 18 and 130 are very nearly equal but differ by a small offset voltage, the solenoid current will be at a value in about the middle of its range. So long as that solenoid current is sustained at a steady state value, the servo valve will remain in a neutral position to lock the rotary valve. When, however, the voltage on line 130 changes to request a new mode, the solenoid current will change greatly either up or down from the midrange valve depending on whether the voltage on line 130 has increased or decreased. The large change in the solenoid current causes a full scale excursion of the pressure in the control chamber 80 so that the spool valve 108 shifts to an extreme position to effect rapid movement of the rotary valve 12. When the rotary valve attains a position corresponding to the requested mode of operation, the potential on line 18 will then become substantially equal to that on line 130 and the solenoid current will again reach its midrange steady state condition and the spool valve will return to its neutral locking position.

It will thus be readily recognized by those skilled in the art that the subject invention provides a relatively simple control for an automotive vehicle transmission.

The embodiment of the invention described herein is for purposes of illustration and the scope of the invention is intended to be limited only by the following claims:

We claim:

1. An electrohydraulic control for an automatic transmission operable in several modes comprising a closed loop control circuit including
    a hydraulically driven rotary valve positionable for selection of any one of several modes,
    an electrical sensor connected with the rotary valve for producing an electrical valve position signal corresponding to the selected mode,
    electrical mode selection means for producing a signal corresponding to a desired mode including a manually operated range selector switch, means for sensing the transmission output speed and a transmission input parameter and producing signals corresponding thereto, and an electrical circuit for generating the desired mode signal as a function of the selector switch position, the speed signal and the input parameter signal,
    means for comparing the desired mode signal to the valve position signal and for producing a control signal according to the difference in signals,
    and hydraulic valve means responsive to the control signal for effecting rotation of the rotary valve to the position corresponding to the desired mode so that the valve position signal and the desired mode signal are substantially matched.

2. An electrohydraulic control for an automatic transmission operable in several modes comprising a closed loop control circuit including
    a hydraulically driven rotary valve positionable for selection of any one of several modes,
    an electrical sensor connected with the rotary valve for producing an electrical valve position signal having a discrete voltage corresponding to the selected mode,
    electrical mode selection means for producing a signal corresponding to a desired mode including a range selecting circuit having a manually operated range selector switch for producing a range signal having a voltage corresponding to the selected range, each range encompassing one or more modes, means for sensing and producing signals according to the transmission input torque and output speed, and an electrical circuit for producing a desired mode signal as a function of the range signal and the relative values of the torque and speed signals such that the desired mode signal has a discrete voltage for each desired mode which is substantially equal to the voltage of the corresponding valve position signal,
    means for comparing the desired mode signal to the valve position signal and for producing a control signal according to the difference in the signals,
    and means responsive to the control signal for effecting rotation of the rotary valve to the position corresponding to the desired mode so that the valve position signal and the desired mode signal are substantially matched.

3. An electrohydraulic control for an automatic transmission operable in several modes comprising a closed loop control circuit including
    a hydraulically driven rotary valve positionable for selection of any one of several modes,
    an electrical sensor connected with the rotary valve for producing an electrical valve position signal corresponding to the selected mode,
    electrical mode selection means for producing a signal corresponding to a desired mode including a manually operated range selector switch, means for sensing the transmission output speed and a transmission input parameter and producing signals corresponding thereto, and an electrical circuit for the desired mode signal as a function of the selector switch position, the speed signal and the input parameter signal,
    means for comparing the desired mode signal to the valve position signal and for producing a control signal according to the difference in the signals, the control signal achieving a norm when the compared signals are substantially equal,
    means responsive to the control signal for effecting rotation of the rotary valve to the position corresponding to the desired mode including a solenoid valve responsive to the control signal for regulating hydraulic pressure according to the value of the control signal, and a spool valve having a regulating section acted upon by the regulated pressure from the solenoid valve for assuming a neutral regulating position when the control signal is at a steady state norm and for shifting the spool valve in either direction when the control signal departs from the norm, and the spool valve further having a control section for selectively connecting line pressure and exhaust to the rotary valve for rotatably driving the rotary valve when the spool valve is shifted and for locking the rotary valve in one position when the spool valve is in a neutral position, so that the rotary valve is driven to a position corresponding to the desired mode.

* * * * *